United States Patent [19]
Holden

[11] 3,938,240
[45] Feb. 17, 1976

[54] METHODS OF PROVIDING A TUBE WITH A THREAD RING

[76] Inventor: Robert Stuart Holden, 24 Coleman Road, Glastonbury, Conn. 06033

[22] Filed: Mar. 5, 1975

[21] Appl. No.: 555,682

Related U.S. Application Data

[62] Division of Ser. No. 409,153, Oct. 24, 1973, abandoned.

[52] U.S. Cl. .................. 29/512; 29/523; 285/354; 285/382.4
[51] Int. Cl.² ................. B21D 39/00; B23P 11/00
[58] Field of Search .......... 29/512, 523 X; 285/354, 285/386, 382.4, 382.5

[56] References Cited
UNITED STATES PATENTS

| | | | |
|---|---|---|---|
| 384,114 | 6/1888 | Barry | 285/386 X |
| 673,971 | 5/1901 | Bartliff | 285/382.5 X |
| 779,896 | 1/1905 | Wood | 285/382.5 X |
| 1,290,613 | 1/1919 | McDonough | 285/386 |
| 1,533,886 | 4/1925 | Mueller et al. | 285/382.5 X |
| 1,738,915 | 12/1929 | Mueller | 285/382.4 X |
| 1,953,665 | 4/1934 | Wallace | 285/382.4 |
| 2,485,960 | 10/1949 | Donahue | 29/512 UX |
| 2,829,802 | 4/1958 | Paull | 29/512 X |
| 3,400,865 | 9/1968 | Hester | 285/354 X |
| 3,497,946 | 3/1970 | Tingley | 29/512 |

Primary Examiner—Charlie T. Moon
Attorney, Agent, or Firm—Harold L. Stults; Pasquale A. Razzano

[57] ABSTRACT

The plumbing assembly includes a tube having a free edge portion at which at least one inverted T-shaped projection is formed. The projection is located with its cross bar extending parallel to the free edge of the tube and the stem thereof extending from the cross bar towards the free edge and terminating at a point spaced therefrom. An annular ring formed with a threaded outer peripheral surface and a relatively smooth inner surface has at least one recess formed in its inner surface for receiving the stem portion of the T-shaped projection, thereby to prevent relative rotation between the tube and the ring.

4 Claims, 13 Drawing Figures

METHODS OF PROVIDING A TUBE WITH A THREAD RING

This is a division, of application Ser. No. 409,153, filed Oct. 24, 1973, now abandoned.

The present invention relates to pipe connections and more particularly to a plumbing assembly or connection.

A typical plumbing assembly at the end of a tube or pipe for use in connecting the pipe to another pipe or plumbing element consists of an annular threaded ring secured to the free end of a pipe. This ring has a smooth inner surface which tightly engages the outer periphery of its associated pipe and is secured to that pipe or tube by soldering or the like. One problem with such assembly however, is that the solder joint is a weak point in the connection and may not be permanently leak proof.

The majority of all threaded rings used in plumbing elements particularly on tubular brass piping, are made of a slightly leaded alloy so that they can be turned from heavywall brass tubing on automatic screw machines. Generally a length of threads is formed rapidly on the screw machine because only a simple outside diameter thread is formed; then the threaded tube is cut into lengths of about ¼ inch to form the rings which are secured to the pipes. However, these threaded rings have become excessively expensive to produce in recent years because of the substantial increase in the price of copper used to form the brass tubes of which the rings are made.

In one previously proposed plumbing connection, the threaded rings are attached to the thin walled brass tubing by expanding the tubing, e.g. with a punch, so that the outside diameter of the tubing engages the inside diameter of the threaded ring. This assembly is then fluxed and soldered to hold the ring in place and prevent it from rotating on its axis when a mating nut is assembled to the threaded ring to form a connection. The nut is usually tightened with a plumber's wrench to form a watertight seal in conjunction with the use of a rubber gasket positioned on top of the threaded ring. Since the plumber can typically produce up to 50 or 60 foot pounds of torque when tightening such connections, if the threaded ring is not properly soldered or locked into position, the connection between the ring and the tube can be broken as the torque increased during tightening, with the result that the joint will not be properly tightened. Moreover, once the threaded ring becomes loose on the tube, it becomes nearly impossible to remove the nut from the ring.

In order to lessen the expense of using a brass threaded ring on tubular brass plumbing parts, it has been proposed that such rings be replaced by zinc die cast threaded rings. However, the use of zinc die cast threaded rings is limited because the zinc ring must in turn be heavily copper plated prior to its assembly to the brass tube in order for the ring to be chrome or nickel plated, as is preferred in the plumbing field. If the zinc ring is not copper plated prior to chrome or nickel plating of the assembly it will be attacked by the plating solutions and turn black, thereby producing an aesthetically unacceptable plumbing connection. Moreover, the decomposition of the zinc in the plating solutions will cause contamination of those solutions.

Still further, zinc rings are generally very brittle and when they are swagged into position on the tubing any oversized variance of the wall thickness in the tube will cause the ring to be expanded beyond its normal limits and thereby break the ring, rendering the entire assembly scrap. Finally the supply of zinc is rapidly increasing so that the price of zinc threaded rings is approaching the price of brass threaded rings, thereby reducing any advantage zinc rings had over brass rings from the aspect of economy.

Accordingly, it is an object of the present invention to produce a plumbing assembly which is economical to manufacture and yet is durable in use.

Yet another object of the present invention is to produce a plumbing assembly which eliminates the use of soldered joints and yet provides a permanent rigid connection between a threaded ring and a tubing.

Another object of the present invention is to provide a plumbing assembly in which a plastic thread ring is permanently mounted on and secured to a brass plumbing tube or pipe.

In accordance with one aspect of the present invention a plumbing assembly is provided in which a threaded ring is rigidly secured to the end of a metal plumbing tube or pipe, without the use of solder. The connection provides a mechanical lock in which projections formed or punched in the end of the tube are received and engaged in recesses formed in the inner surface of the threaded ring. The projections are in the form of inverted T's with the cross bar of the T's extending parallel to the free edge of the tube and the stems of the T extending upwardly from the cross bar to a point spaced a predetermined distance from the free edge of the tube. The cross bar of the T prevents axial movement of the ring downwardly beyond the projection while the stem of the T-shaped projection prevents rotation of the ring with respect to the tube. After the ring is mounted on the tube, the free edge of the tube is flared over a portion of the ring so as to prevent movement of the ring axially over the free edge of the tube. In this manner, a permanent mechanical lock is provided between the ring and the tube.

The lock formed by the present invention avoids the problems of soldered joints as provided in previously proposed arrangements, and is strong enough to withstand the normal torque applied to a tube by a plumber making a connection. Moreover, because the connection between the ring and the tube is a mechanical connection requiring no soldering, a plastic threaded ring can be used in lieu of the metal rings previously proposed. This substantially reduces the cost of producing the plumbing connection since, of course, plastic is substantially less expensive than either brass or zinc. Moreover, the plastic is easier to handle and plate as compared to zinc and has substantial hoop tension or strength so that it will not break when the tube is swagged or expanded to firmly lock the same within the ring.

The above and other objects, features and advantages of this invention, will be apparent in the following detailed description of an illustrative embodiment thereof which is to be read in connection with the accompanying drawings wherein.

Figure 1:
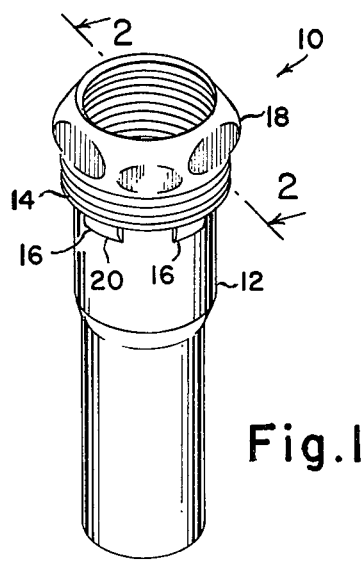
FIG. 1 is a perspective view of a plumbing connector formed in accordance with one embodiment of the present invention.

Referring now to the drawing in detail and initially to FIG. 1 thereof, it will be seen that a plumbing assembly 10 constructed in accordance with the present invention includes a tube or pipe 12 having an annular threaded ring 14 mounted thereon. The pipe 12 is preferably formed of metal, e.g. chrome plated brass, and has a plurality of inverted T-shaped projections 16 formed therein, as described hereinafter, to mechanically lock ring 14 against rotation. Ring 14 is preferably formed of a plastic material such as a dense polyethylene or the like. In any case, the ring has a nut 18 of conventional construction threadedly secured thereto, which nut is used to secure assembly 10 to another tube or pipe.

Figure 2:
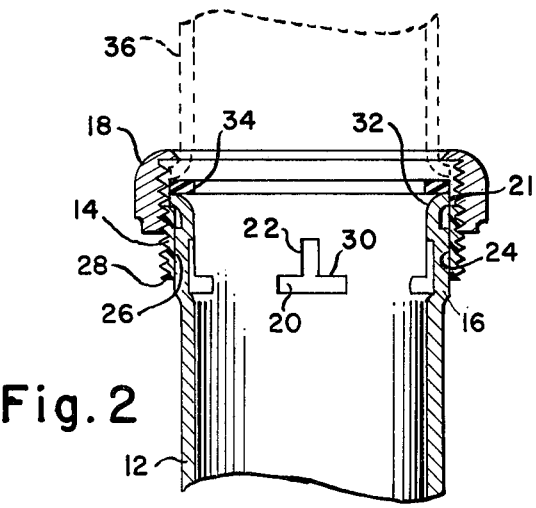
FIG. 2 is a sectional view of the plumbing connector taken along lines 2—2 of FIG. 1.
Figure 4:
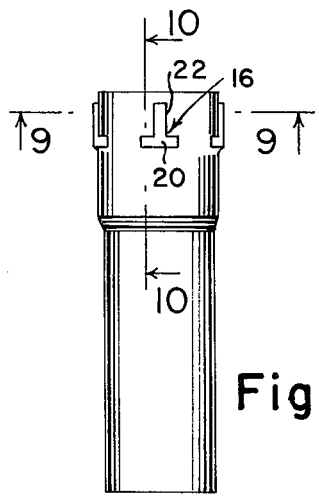
FIG. 4 is an elevational view of a tube or pipe used in the plumbing connection of the present invention prior to the placement of a threaded ring thereon.

As seen more clearly in FIG. 2, projections 16 are formed as punched embossments or dimples in the periphery of tube 12. The T-shaped projections include a cross bar section 20 which extends generally parallel to the free edge 21 of the tube 12 and a stem portion 22 which extends parallel to the axis of the tube and towards the free end 21, but which terminates at a predetermined distance from that free edge.

Ring 14 has a recess 24 formed along its inner surface 26 which snugly receives the stem portion 22 of the projection 16 thereby locking the ring against rotation with respect to tube 12. Also, the lower surface 28 of ring 14 engages the edge or surface 30 of cross bar 20, and prevents movement of the ring downwardly along the tube beyond the cross bar. The ring is then locked against axial movement (in the opposite direction) by producing the flared portion 32 of tube 12 adjacent its free edge 21.

To complete the plumbing connection (see FIG. 2) a gasket 34 of rubber, plastic or the like is positioned over the flared portion 32 of pipe 12 and the nut 18 then is threaded onto ring 14. Nut 18 permits a connection to be made between pipe 12 and a connecting pipe 36, shown in phantom lines in FIG. 2, which pipe can be either clamped in place by a flare 38 on its end, as illustrated in FIG. 2, or which can be threadedly engaged with the threads 40 of the nut in a conventional manner.

Preferably, tube 12 has two or four projections 16 formed therein, as described hereinafter. However, it is contemplated that one, three or more projections can be used as desired, depending upon the strength to be obtained in the connection and the size of the tube 12 being used.

Figure 3:
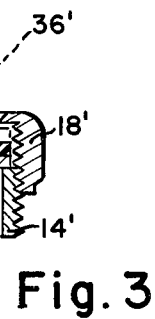
FIG. 3 is a sectional view, similar to FIG. 2, of a prior art plumbing connection.
Figure 10:
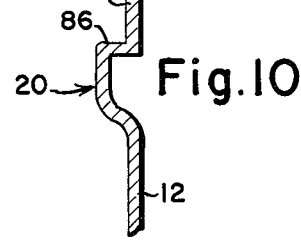
FIG. 10 is a sectional view of the cross bar of the projection taken along lines 10—10 of FIG. 4.
Figure 5A:
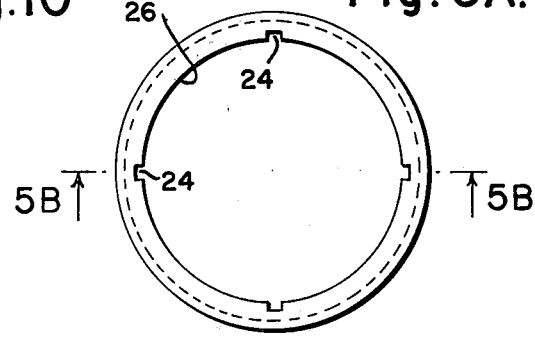
FIG. 5A is a plan view of a threaded ring formed in accordance with the present invention.

The plumbing assembly of the present invention has numerous advantages over the prior art, such as shown in FIG. 3, since it eliminates the solder connection typically provided between a thread ring and the metal tube. For example, as shown in the prior art plumbing assembly of FIG. 3, the tube or pipe 12' has a metal threaded ring 14' secured thereto, which ring has a smooth inner surface 26' that is soldered to the outer surface of tube 12'. This solder connection, as mentioned above, is a weak point in the assembly and often breaks when the nut 18' is engaged therewith by the torque force applied by the plumber. When this occurs the assembly is destroyed and it becomes almost impossible to remove the nut from the rotatable ring. In addition the solder connection is not always entirely waterproof, so that even where a washer 34' or the like is used liquid flowing through the plumbing connection can pass beneath the washer and through the joint between the ring and pipe, causing a severe leak. Moreover, the construction of the prior art assembly of FIG. 3 requires that threaded ring 14' be formed of a metallic material which can be soldered to pipe 12'. By the present invention on the other hand, a plastic threaded ring can be used which is approximately one fifth the cost of the brass ring used in the prior art. Moreover, as a result of the mechanical connection, the manufacturer will save excessive costs of solder, flux, gas and labor which are used in the soldering process.

The use of the plumbing assembly of the present invention, including the plastic ring 14, is also highly advantageous over the previously proposed prior art structures using zinc rings since with the plastic ring there is no need to plate the ring, and even if it is plated with chrome or the like, the plastic is impervious to plating solutions so that the problems of plating zinc rings are avoided. Moreover, since the plastic itself is elastic in nature, it avoids the splitting and fracturing problems of zinc rings which heretofore caused the production of considerable scrap in the manufacturing process. Still further, the use of a plastic ring, made possible by the mechanical connection in the plumbing assembly of the present invention between the ring and the tube, eliminates the possibility of galvanic action which often occurs when brass threaded rings 14 and zinc nuts 18 are used, as in the prior art. Such galvanic action in the prior art often creates oxides over a long period of time which eventually fuses the parts together so that the entire assembly is difficult to open and often causes a requirement for replacement.

Figure 6A:
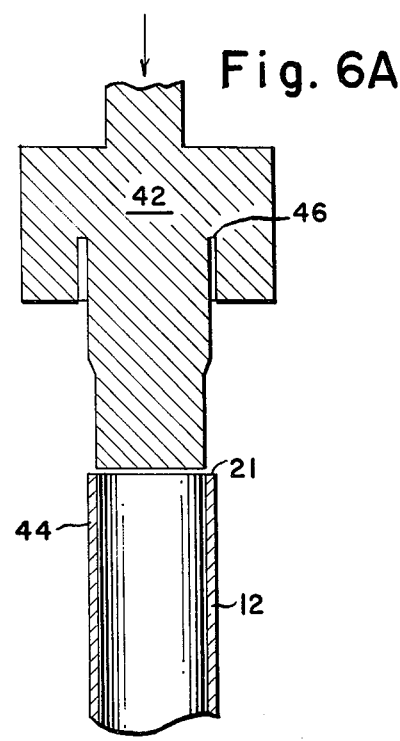
FIGS. 6A and 6B are schematic sectional views of an initial swagging or punching operation performed on a tube to be used in forming the plumbing connection of the present invention.
Figure 6B:
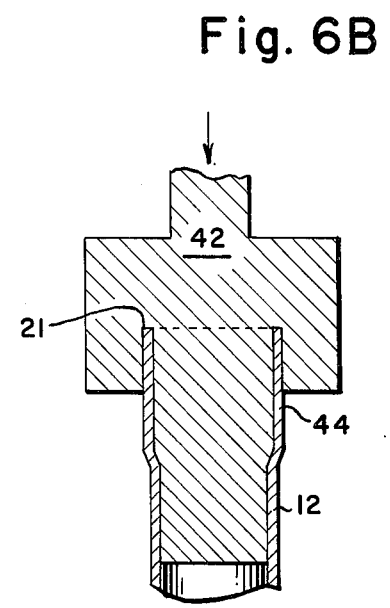

In manufacturing the plumbing assembly of the present invention a length of metal pipe or tube 12 having a diameter slightly less than the inside of the diameter of the threaded ring to which it is to be secured, is cut to the desired length with a square edge 21. The tube is initially swagged or expanded in book dies with a punch 42, as seen in FIGS. 6A and 6B, in the conventional manner in order to slightly expand the end 44 of the tube to approximately the internal diameter of the thread ring to which it is to be connected. The punch 42 can be "stopped off" as at 46, in the conventional manner, to insure that a square punch is made at the end of the tube without effecting the function of the tube or its general appearance.

Figure 7:
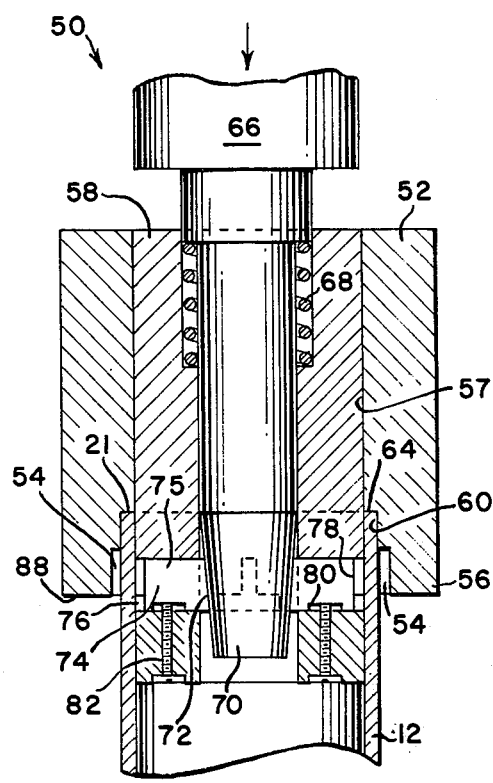
FIG. 7 is an enlarged sectional view of the punch used to form the projections in the plumbing tube of the connector, before the punch is made.

After the tube 12 is swagged in this manner (as seen in FIG. 6B) the projections 16 are formed in the upper end 44 thereof. This is accomplished by the use of a punch 50, shown in FIGS. 7 and 8. Punch 50 includes an outer annular one piece collar 52 having a plurality of vertically extending recesses 54 formed at the lower end 56 of its inner surface 57. These recesses correspond to, and are used in the punch to form, the stem portions 22 of the projections 16. Punch 50 also includes an inner rigid and relatively stationary insert member 58 which has an outer diameter that is substantially equal to the inner diameter of the swagged tube 12. The insert member 58 cooperates with an annular groove 60 formed on the inner surface 57 of collar 56 to define a channel 64 which receives the free edge 21 of tube 12, as seen in FIG. 7. Finally, punch 50 includes a punch member 66, which is biased into a first or upper position by a spring 68, as seen in FIG. 7. The punch is operatively connected to a hydraulic ram or the like which is adapted to urge the same downwardly during the punching operation as described hereinafter.

The lower end portion 70 of punch 66 has a tapered generally conically shaped configuration which is adapted to engage the ends 72 of a plurality of punch members 74. Punch members 74 constitute individual bars slidably mounted within radially extending slots 75 in insert 58. The free ends 76 of the punches 74 have an inverted T-shaped configuration, as seen in dotted lines in FIGS. 7 and 8, which correspond substantially to the configuration of the projections 16 to be formed in tube 12. Thus, the stem portion 78 of the punch end 76 is adapted to extend into recess 54 in collar 52 so as to form the stem portion of the projection when the punch 66 is moved downwardly.

Figure 8:
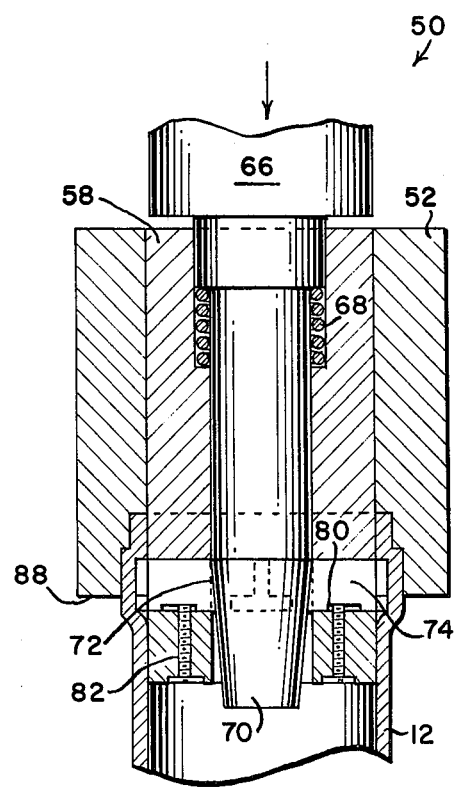
FIG. 8 is a view similar to FIG. 7 showing the punch expanded and forming the projections in the tube.

Thus, for example as seen in FIG. 8, when punch 66 is urged downwardly upon actuation of its driving member the conically shaped end portion thereof engages the ends 72 of punch members 74, causing the punch members to move radially outwardly into engagement with the walls of tube 12. The force of the punch 66 causes punch members 74 to expand the wall of tube 12 adjacent the punch ends 76 in a manner conforming to the inverted T-shaped configuration of the punch. The outward stroke of the members 74, and the size of the projection formed thereby are limited by the recess 54 in collar 52.

In order to prevent inadvertent removal of the punch members 74 from insert 56, each punch member is provided with an elongated slot 80, formed at its lower end, as seen in FIGS. 7 and 8 in which the end of a bolt 82 is adapted to be received. The bolts 82 prevent members 74 from being slidably removed from slots 75 in insert 58, and also serve to limit the radial projection of the punch member 74. In addition, it is contemplated that punch 66 and punch members 74 can be magnetized, so that when the punch member 66 is withdrawn, punch members 74 automatically withdraw into the insert member 58, thereby freeing the ends 76 of punch members 74 from the projections which they have formed. After the punching operation is completed in this manner tube 12 is conveniently removed from the punch simply by axially moving the tube or the entire punch assembly away from the tube.

In accordance with a feature of the present invention, a one-piece annular collar 52 can be used with punch 50 rather than the multiple piece collars used in typical tube punching operations. The annular collar is stronger than the multiple piece collars, is less expensive to manufacture, and requires less handling during the manufacturing process. The use of the one-piece annular collar is permitted by the present invention because the projections are formed with only the axially extending end portions of the inverted T—s located within the collar, thereby permitting tube 12 to be removed axially from the punch member without interference from the collar or the punch.

Figure 9:
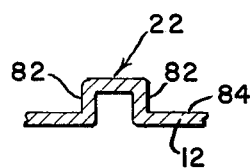
FIG. 9 is a sectional view of a projection formed by the punch of FIGS. 7 and 8, and taken along line 9—9 of FIG. 4.

In accordance with yet another feature of the present invention, the provision of the recesses 54 in the collar 52 insure that the sides of the stem portion of the projection are relatively square with respect to the surface of the tube. For example, as seen in FIG. 9, the stem portion 22 of the projection 16 has side portions 82 which extend at substantially right angles to the peripheral surface 84 of tube 12. In this manner a positive locking engagement is provided between the projection and the square recesses 24 formed in the annular rings 14. The edges 82 are formed square in this manner because they are formed within the square recess 54 in the annular collar 52. As a result of this configuration, no camming action can take place between the stem 22 and the ring 14 during rotation or turning of the nut 18 in the assembly operation, thereby insuring a positive lock between the tube and annular ring.

Similarly, the upper edge 86 of the cross bar portion 20 of projection 16 also is relatively square to the surface 84 of tube 12, i.e. it extends generally perpendicularly thereto, since it is formed against the bottom edge 88 of collar 52. It is important that this edge also be square since it cooperates with the lower surface 28 of ring 14 to prevent the ring from moving axially downwardly along the tube 12. On the other hand, the opposite side of the cross bar 16, i.e. the side which is located away from the free edge of the tube and away from the edge 88 of the collar 52, does not have as square a surface portion since it is not formed against any edge portion of the collar.

After the projections 16 are formed in tube 12, the threaded ring 14 is placed thereon. As previously described, the ring 14 is an annular member having a threaded outer surface and a relatively smooth inner surface having recesses 24 formed therein which are adapted to receive the stem portions of the projection 16. The inside diameter of the smooth surface of ring 14 is slightly larger than the diameter of the swagged end 44 of tube 12, so that the ring can be readily easily mounted thereon with the stem portions of the projection 16 received within the recesses 24 of the ring to lock the ring against rotation with respect to the tube.

Figure 11:
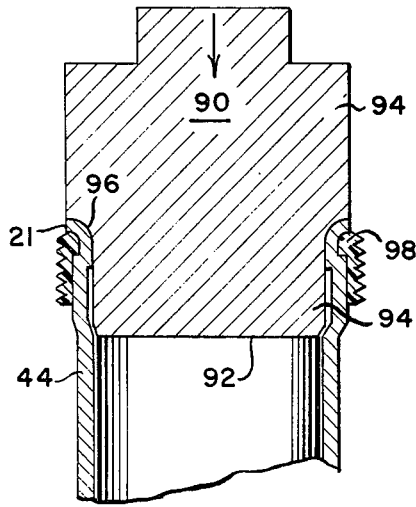
FIG. 11 is a schematic elevational view of a punch used to swag and flare the plumbing tube after the ring is mounted thereon.
Figure 5B:
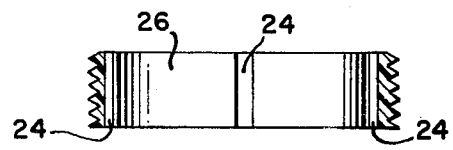
FIG. 5B is a sectional view taken along lines 5B—5B of FIG. 5A.

After ring 14 is mounted on tube 12 in this manner the tube is further swagged so as to expand its diameter to be substantially equal to that of the ring whereby the tube fits snugly against the inside diameter of the threaded ring. This is achieved by the provision of an additional punch or swaging member 90, as seen in FIG. 11 having a small diameter lead in portion 92 and a larger diameter portion 94 which swages the upper end portion 44 of tube 12, to increase its diameter. In addition, the upper edge portion 96 of the swage portion 94 of the punch is outwardly flared, as seen in FIG. 11, so that at the completion of the swaging stroke the top free edge 21 of tube 12 is outwardly flared and turned over the top edge 98 of ring 14, as seen most clearly in FIG. 2. In this manner the thread ring 14 is confined between the flared portion of the tube and the cross bar of the projection 16 so that axial movement of the ring along the tube in either direction is prevented. Because the tube is flared in this manner, in the formation of projections 16 by punch 50 the projections are formed with the upper end portion 100 of the stems 22 thereof spaced a predetermined distance below the free edge 21 of the tube. This spacing leaves sufficient tubing above the projection to permit the flaring operation to be performed. It is noted that the flare formed by the punch 90 must be sufficient to cover a portion of the top of the thread ring but it must not go beyond the minor diameter of the rings of the threads otherwise a problem would result in mating the threaded ring with the nut 18. Moreover, flaring the smooth upper end of the tube, i.e. the portion of the tube above the ends of the projection 16, provides a relatively smooth surface for cooperation with the gasket 34, thereby providing a much better liquid tight seal. This seal, in fact, is substantially better than the solder seal shown in FIG. 3, since no liquid can pass through the flared portion of the tube and between the ring and the tube, as occurs in the prior art connector assemblies wherein improper soldering can cause spaces of openings to occur between the tube and the thread ring.

Accordingly, it is seen that a relatively simply manufactured plumbing connector assembly is provided in which either a metal or a plastic thread ring can be permanently secured to the end of a metal tubing, and secured against axial or rotational movement with respect to the tube, while simultaneusly forming an improved watertight seal.

Although an illustrative embodiment of the present invention has been described herein with reference to the accompanying drawings, it is to be understood that the invention is not limited to that precise embodiment and that various changes and modifications may be effected therein by one skilled in the art without departing from the scope or spirit of this invention.

What is claimed is:

1. A method of making a tube having at least one free edge portion formed at one end thereof, said tube having at least one T-shaped projection formed thereon adjacent said free edge, said projection being located with the cross bar thereof extending generally parallel to said free edge and the stem thereof extending from said cross bar towards said free edge and terminating at an end spaced from said free edge; and an annular ring having a threaded outer peripheral surface and an inner surface which mates with the outer surface of said tube at said one end, said ring having a recess formed therein for snugly receiving the stem portion of said projection, thereby to prevent relative rotation between said tube and said ring; said method comprising the steps of punching said T-shaped projections into said tube by inserting an expandable punch axially into said tube, surrounding said free end portion of the tube with an annular collar having at least one recess therein complementary to the stem portion of the projection; expanding said punch to stamp said projection in the tube removing said tube from said punch and collar and sliding said ring over said tube, with the recesses in the ring receiving the stem of said projection, and seating said ring in engagement with the cross bar of said projection.

2. The method as defined in claim 1 including the step of expanding the free end of said tube to a diameter substantially equal to the inner diameter of said ring, after said ring is placed on said tube, and outwardly flaring said free end portion of the tube over a portion of said ring.

3. The method as defined in claim 2 including the step of initially expanding said one end of said tube prior to said punching step.

4. The method as defined in claim 3 wherein said punch has at least one T-shaped punch member therein and said step of inserting said punch in said tube comprises the step of inserting the punch to a level at which the stem of the T-shaped punch member will enter the recess in said collar when the punch is expanded and the cross bar portion of the punch will be located at a level below the end of said collar but adjacent thereto, whereby the sides of the stem portion of said projections and the sides of the cross bars of said projections facing said free edge extend substantially perpendicularly outward from the outer surface of said tube.

* * * * *